United States Patent
Chen et al.

(10) Patent No.: US 10,651,435 B2
(45) Date of Patent: May 12, 2020

(54) TOP COVER ASSEMBLY FOR SECONDARY BATTERY, AND SECONDARY BATTERY

(71) Applicant: CONTEMPORARY AMPEREX TECHNOLOGY CO., LIMITED, Ningde (CN)

(72) Inventors: Baisong Chen, Ningde (CN); Peng Wang, Ningde (CN); Zhiyu Wang, Ningde (CN); Quankun Li, Ningde (CN); Taosheng Zhu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 72 days.

(21) Appl. No.: 15/950,638

(22) Filed: Apr. 11, 2018

(65) Prior Publication Data

US 2019/0044104 A1    Feb. 7, 2019

(30) Foreign Application Priority Data

Aug. 2, 2017 (CN) ...................... 2017 2 0956224 U

(51) Int. Cl.
*H01M 2/04* (2006.01)
*H01M 2/34* (2006.01)
*H01M 2/30* (2006.01)

(52) U.S. Cl.
CPC .......... *H01M 2/0486* (2013.01); *H01M 2/30* (2013.01); *H01M 2/345* (2013.01); *H01M 2200/20* (2013.01)

(58) Field of Classification Search
None
See application file for complete search history.

(56) References Cited

U.S. PATENT DOCUMENTS

| 2007/0275298 | A1* | 11/2007 | Igoris | H01M 2/046 |
| | | | | 429/62 |
| 2008/0116851 | A1* | 5/2008 | Mori | H01M 2/34 |
| | | | | 320/134 |
| 2014/0302359 | A1* | 10/2014 | Huang | H01M 2/345 |
| | | | | 429/61 |
| 2016/0293930 | A1* | 10/2016 | Guen | H01M 2/345 |

* cited by examiner

*Primary Examiner* — Carmen V Lyles-Irving
(74) *Attorney, Agent, or Firm* — Tucker Ellis LLP

(57) ABSTRACT

A top cover assembly for secondary battery, including: first and second electrode terminals; a top cover plate insulated from the first electrode terminal and electrically connected with the second electrode terminal; a contact piece attached to the top cover plate; and a thermo-deformable piece opposite to the contact piece, one end being electrically connected with the first electrode terminal, the other end being a free end; when a temperature at which the thermo-deformable piece deforms is not reached and internal pressure of the secondary battery exceeds a reference pressure, the contact piece deforms to be electrically connected with the thermo-deformable piece so that the first electrode terminal is electrically connected with the second electrode terminal, and when the temperature at which the thermo-deformable piece deforms is reached, the free end deforms away from the contact piece, and the thermo-deformable piece is kept insulated from the contact piece.

16 Claims, 6 Drawing Sheets

TOP COVER ASSEMBLY FOR SECONDARY BATTERY, AND SECONDARY BATTERY

CROSS-REFERENCE TO RELATED APPLICATIONS

The present application claims priority to Chinese Patent Application No. 201720956224.9, filed on Aug. 2, 2017, the content of which is incorporated herein by reference in its entirety.

TECHNICAL FIELD

The present application relates to the technical field of energy storage devices and, particularly, relates to a top cover assembly for a secondary battery, and a secondary battery.

BACKGROUND

Secondary batteries (for example, lithium ion battery) have advantages of high energy density, high power density, long cycling life, and long storage life, etc., have been widely applied in portable electronic devices, such as mobile phones, digital cameras, portable computers and so on, and also have a broad application prospect in electric transportation vehicles, such as electric vehicles, electric bicycles and so on, and large and medium electric equipment such as energy storage facilities and so on. The secondary battery has become a key solution for solving worldwide problems such as energy crisis and environment pollution.

When the secondary battery is overcharged, the electrolyte solution in the secondary battery will decompose so that the internal pressure of the secondary battery increases, which causes fire and explosion to the battery. In order to prevent the fire and explosion caused by the increase of the internal pressure, an external short-circuit unit, and a fuse placed between the positive electrode plate and the positive electrode terminal. When the internal pressure of the secondary battery increases, the external short-circuit unit connects the positive electrode plate with the negative electrode plate of the electrode assembly into a short circuit providing a great current, which in turn fuses the fuse between the positive electrode plate and the positive electrode terminal, thereby cutting off the charging state of the electrode assembly.

However, the structure as described above reduces the ability of the secondary battery to cope with a high temperature environment. For example, in the hot-box test, the probability of thermal runaway of the secondary battery with the above structure significantly increases. It is because: in the high temperature environment, not only the internal pressure of the secondary battery increases with the decomposition of the electrolyte solution at the high temperature, but also the inner resistance of the electrode assembly increases; at this time, if a short circuit is formed by connecting the positive electrode plate with the negative electrode plate of the secondary battery by the external short-circuit unit, the electrode assembly will generate more heat due to the increase of the internal resistance and the presence of the short circuit current, which worsens risks of fires and explosion of the secondary battery. In other words, the external short-circuit unit in the related art can only solve the overcharge problem of the secondary battery at normal temperature, while increasing the probability of thermal runaway at high temperature, reducing the safety of the secondary battery.

SUMMARY

The present application provides a top cover assembly for a secondary battery, which can reduce the probability of thermal runaway at high temperature and improve safety of the secondary battery.

A first aspect of the present application provides a top cover assembly for a secondary battery, comprising: a first electrode terminal; a second electrode terminal; a top cover plate insulated from the first electrode terminal and electrically connected with the second electrode terminal; a contact piece attached to the top cover plate; and a thermo-deformable piece placed opposite to the contact piece, one end of the thermo-deformable piece being electrically connected with the first electrode terminal, the other end of the thermo-deformable piece being a free end; wherein when a temperature at which the thermo-deformable piece deforms is not reached and an internal pressure of the secondary battery exceeds a reference pressure, the contact piece deforms under the internal pressure to be electrically connected with the thermo-deformable piece so that the first electrode terminal is electrically connected with the second electrode terminal, and when the temperature at which the thermo-deformable piece deforms is reached, the free end deforms along a direction away from the contact piece, and the thermo-deformable piece is kept insulated from the contact piece.

In an embodiment, when the temperature at which the thermo-deformable piece deforms is reached, the internal pressure of the secondary battery increases, and when the internal pressure of the secondary battery exceeds the reference pressure, the contact piece deforms under the internal pressure, and a space is kept between the free end deformed and the contact piece.

In an embodiment, wherein the thermo-deformable piece comprises a first deformable plate and a second deformable plate stacked up, the first deformable plate is placed at a side of the second deformable plate close to the contact piece, and a thermal expansion coefficient of the first deformable plate is greater than a thermal expansion coefficient of the second deformable plate.

In an embodiment, the first deformable plate is made of manganese-nickel-copper alloy, nickel-chromium-iron alloy, nickel-manganese-iron alloy, or nickel, and the second deformable plate is made of nickel-iron alloy.

In an embodiment, the thermo-deformable piece comprises a first deformable plate and the second deformable plate stacked up, the first deformable plate is placed at a side of the second deformable plate close to the contact piece, the first deformable plate and the contact piece are made of a same material, the second deformable plate is made of a memory alloy, and an electrical resistivity of the first deformable plate is smaller than an electrical resistivity of the second deformable plate.

In an embodiment, the first deformable plate and the contact piece are made of aluminum or aluminum alloy, the second deformable plate is made of gold-cadmium alloy, silver-cadmium alloy, copper-zinc alloy, copper-zinc-aluminum alloy, copper-zinc-tin alloy, copper-zinc-silicon alloy, copper-tin alloy, copper-zinc-gallium alloy, indium-titanium alloy, gold-copper-zinc alloy, nickel-aluminum alloy, iron-platinum alloy, titanium-nickel alloy, titanium-nickel-palladium alloy, titanium-niobium alloy, U-niobium alloy, or iron-manganese-silicon alloy.

In an embodiment, an angular displacement of the free end along the direction away from the contact piece is in a range of 0°-5°.

In an embodiment, the top cover assembly further comprises a first conduction piece connected to the first electrode terminal, wherein one end of the thermo-deformable piece is connected with the first conduction piece and the thermo-deformable piece is electrically connected with the first electrode terminal via the first conduction piece, the end of the thermo-deformable piece connected with the first conduction piece is a connection end, and the connection end is placed in the first conduction piece.

In an embodiment, the thermo-deformable piece comprises an arc section, and the connection end is connected with the free end via the arc section.

A second aspect of the present application provides a secondary battery. The secondary battery comprises: a housing; any of the top cover assemblies as described above, the top cover assembly being connected to an opening of the housing to form a packaging space; and an electrode assembly packaged in the packaging space. The electrode assembly comprises a first electrode plate, a second electrode plate, and a separator placed between the first electrode plate and the second electrode plate; and the first electrode terminal is electrically connected to the first electrode plate, and the second electrode terminal is electrically connected to the second electrode plate.

The solutions provided by the present application have the following beneficial effects:

The present application provides a top cover assembly for a secondary battery, including a contact piece and a thermo-deformable piece. In one aspect, at normal temperature, the overcharge of the secondary battery causes the electrolyte solution to generate gas, which in turn increases the internal pressure of the secondary battery. When the internal pressure exceeds the reference pressure, the contact piece deforms under the internal pressure to be electrically connected with the thermo-deformable piece, and at this time the first electrode terminal is electrically connected with the second electrode terminal 13, the overcharge state is stopped, thereby improving the safety performance of the secondary battery; in another aspect, when the secondary battery is in a high temperature (for example, in the hot-box test or at an environment temperature of 80° C.-150° C.), the thermo-deformable piece deforms away from the contact piece and is kept insulated from the contact piece. As such, the contact piece won't contact the thermo-deformable piece at a high temperature, thus, the first electrode terminal won't be electrically connected with the second electrode terminal, and the situation that a large amount of heat is generated due to great internal resistance of the secondary battery and the short circuit current won't occur, thereby reducing the probability of accidents such as fire or explosion to the electrode assembly, and improving safety performance of the secondary battery.

It should be interpreted that the general description above and the detailed description below are merely exemplary and cannot limit the present application.

REFERENCE SIGNS

1—top cover assembly;
   11—first electrode terminal;
      11a—flange portion;
      11b—riveting portion;
   12—first conduction piece;
   13—second electrode terminal;
   14—top cover plate;
      141—hole;
   15—second conduction piece;
   16—resistor;
2—electrode assembly;
3—housing;
4—insulation member;
   41—first portion;
   42—second portion;
      421—through hole;
5—sealing member;
6—contact piece;
   61—edge portion;
   62—deformable portion;
   63—central portion;
7—thermo-deformable piece;
   71—first deformable plate;
   72—second deformable plate;
   7a—connection end;
   7b—free end;
   7c—arc section;
104—first insulation piece;
   104a—air vent;
105—second insulation piece;
106—explosion-proof valve;
107—protective patch;
108—injection hole.

The accompanying drawings herein are incorporated into the specification and constitute a part of the specification, which illustrate the embodiments suitable for the present application and are used to explain the principles of the present application together with the description.

DESCRIPTION OF EMBODIMENTS

The present application is further described in detail by the specific embodiments with reference to the accompanying drawings.

Figure 1:
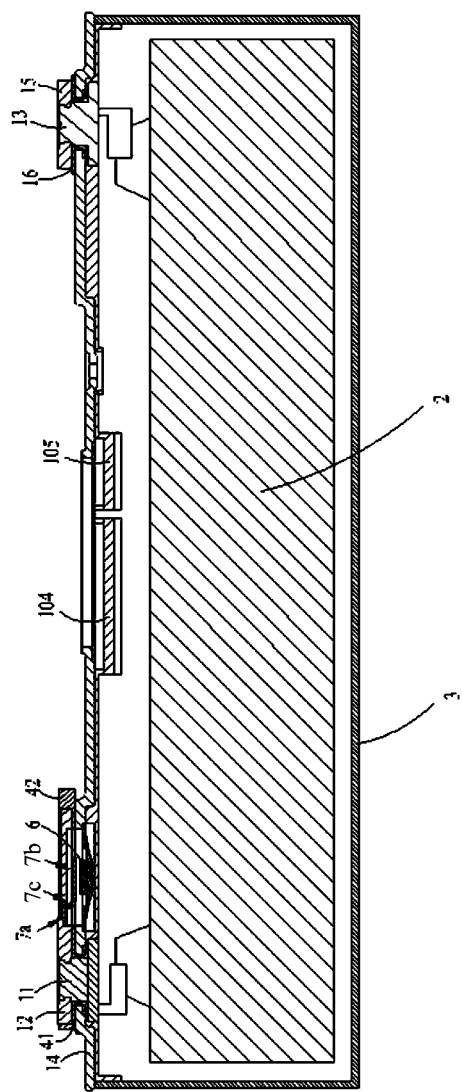
FIG. 1 illustrates a cross-sectional view of a secondary battery provided by the present application.

As shown in FIG. 1, an embodiment of the present application provides a top cover assembly for a secondary battery 1, including a first electrode terminal 11, a first conduction piece 12, a second electrode terminal 13, and a top cover plate 14. The first electrode terminal 11 and the second electrode terminal 13 are configured to be electrically connected to the electrode assembly 2, and are amounted to penetrate through and beyond the top cover plate 14, for realizing that the electrode assembly 2 is electrically connected with an component outside the housing 3, thereby outputting electric energy in the electrode assembly 2.

Figure 2:
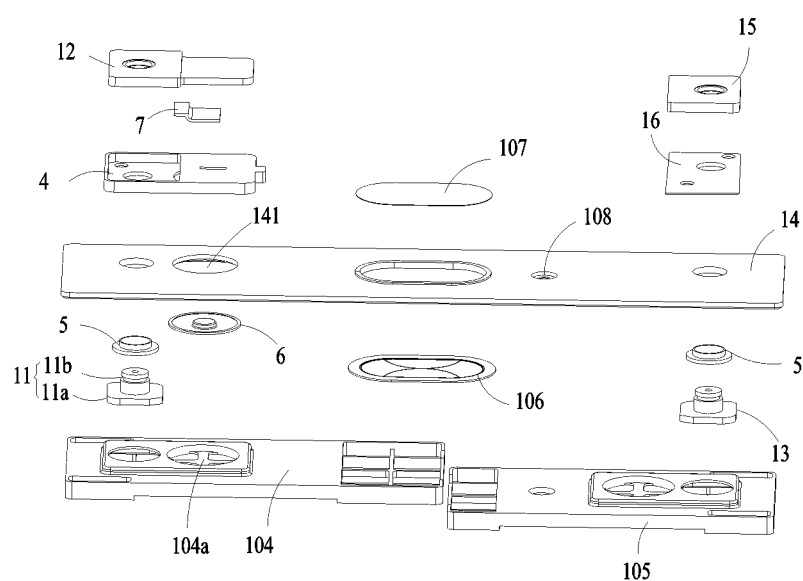
FIG. 2 illustrates an exploded view of a top cover assembly for a secondary battery provided by the present application.

As shown in FIG. 2, each of the first electrode terminal 11 and the second electrode terminal 13 includes a flange portion 11a and a riveting portion 11b. When the top cover assembly 1 and the housing 3 are assembled, the flange portion 11a is located in the interior of the housing 3, the riveting portion 11b is located outside the housing 3, and the first conduction piece 12 is riveted with the riveting portion 11b, so that the first conduction piece 12 is supported by a first side (for example, external side) of the top cover plate 14 from the exterior of the housing 3, the flange portion 11a is supported by a second side (for example, internal side) of the top cover plate 14 from the interior of the housing 3, and the first side and the second side are opposite to each other. As such, the first electrode terminal 11 and the second electrode terminal 13 are fixed onto the top cover plate 14.

It should be noted that the connection manner between the first conduction piece 12 and the first electrode terminal 11 is not limited to riveting. Optionally, the riveting portion 11b may be instead a screw stem portion, and the first conduction piece 12 and the first electrode terminal 11 are in threaded connection. Or, the first conduction piece 12 may be connected with the first electrode terminal 11 by welding.

Figure 3:
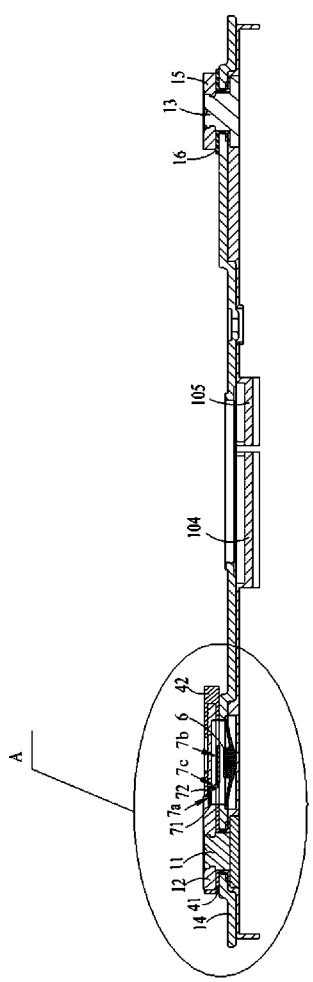
FIG. 3 illustrates a cross-sectional view of a top cover assembly for a secondary battery provided by the present application.
Figure 4:
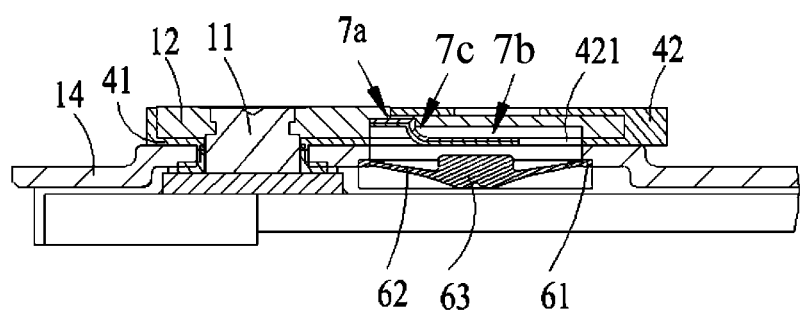
FIG. 4 illustrates an enlarged view of portion A shown in FIG. 3.
Figure 5:
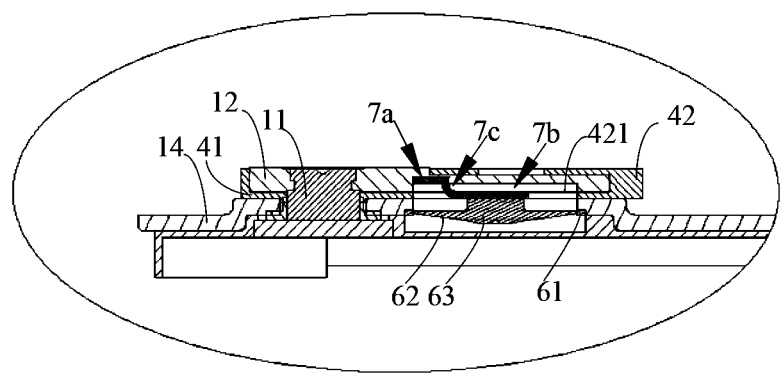
FIG. 5 illustrates that when a temperature at which a thermo-deformable piece 7 deforms is not reached but an internal pressure of the secondary battery exceeds a reference pressure, a contact piece 6 deforms under the internal pressure to be electrically connected with the thermo-deformable piece 7 so that a first electrode terminal 11 is electrically connected with a second electrode terminal 13.
Figure 6:
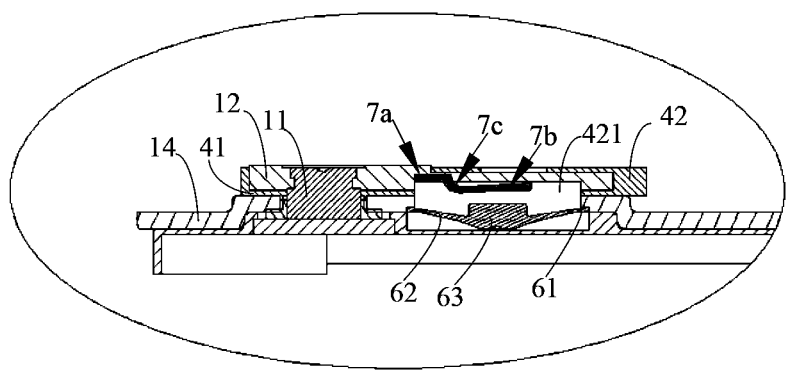
FIG. 6 illustrates that when the temperature at which the thermo-deformable piece 7 deforms is reached, a free end 7b deforms along a direction away from the contact piece 6, and the thermo-deformable piece 7 is kept insulated from the contact piece 6.
Figure 7:
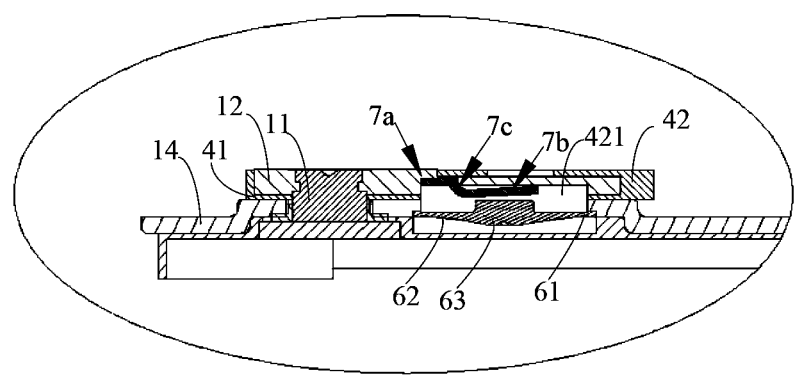
FIG. 7 illustrates that when the temperature at which the thermo-deformable piece 7 deforms is reached and the internal pressure of the secondary battery exceeds the reference pressure, the contact piece 6 deforms under the internal pressure, and a space is kept between the free end 7b deformed and the contact piece 6.
Figure 8:
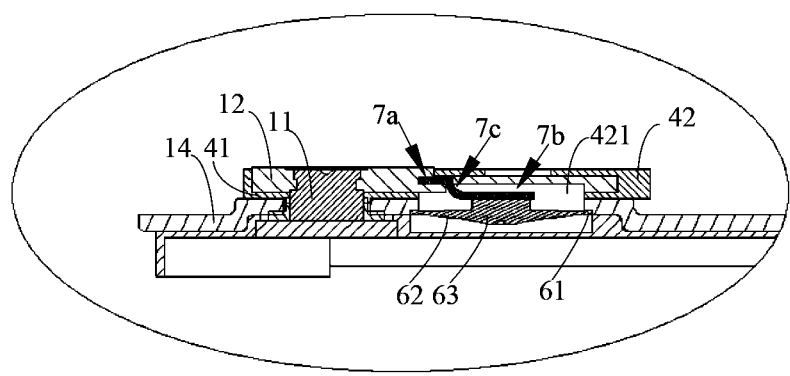
FIG. 8 illustrates that a connection end 7a is placed in a conduction piece 12.

As shown in FIGS. 3-4, the top cover plate 14 is electrically connected with the second electrode terminal 13, and is insulated form the first electrode terminal 11 and the first conduction piece 12. The insulation of the top cover plate 14 from the first electrode terminal 11 and the first conduction piece 12 can be specifically configured in a manner that the top cover assembly 1 further includes an insulation member 4 and a sealing member 5. The insulation member 4 includes a first portion 41 and a second portion 42, the first portion 41 are sandwiched and fixed between the top cover plate 14 and the first conduction piece 12, the riveting portion 11b of the first electrode terminal 11 penetrates through the first portion 41 and extends out from the top cover plate 14, the second portion 42 surrounds the peripheral edge of the first conduction piece 12, and the insulation member 4 insulates the top cover plate 14 from the first conduction piece 12. The sealing member 5 is sleeved on the outside of the lower part of the riveting portion 11b, and contacts the insulation member 4. The sealing member 5 is generally made of plastic materials, by which it is realized that the top cover plate 14 is sealed with and insulated from the first electrode terminal 11.

The riveting portion 11b of the second electrode terminal 13 is further connected with a second conduction piece 15, and the second conduction piece 15 facilitates electric connection between the second electrode terminal 13 and an external component. In addition, the top cover assembly 1 further includes a sealing member 5 with the same structure as above at the side of the second electrode terminal 13, for realizing sealing of the second electrode terminal 13. A resistor 16 used for reduce current in the circuit is connected between the second conduction piece 15 and the top cover plate 14. When a conductor penetrates through the housing 3 and causes an internal short circuit of the secondary battery, the resistor 16 can reduce current of the short circuit, and reduce probability of accidents such as fire, thereby improving safety performance of the secondary battery.

The secondary battery may further include a contact piece 6 and a thermo-deformable piece 7. The contact piece 6 is attached to the top cover plate 14. One end of the thermo-deformable piece 7 is a connection end 7a electrically connected with the first electrode terminal 11, the other end of the thermo-deformable piece 7 is a free end 7b, and the thermo-deformable piece 7 is placed opposite to the contact piece 6 along a height direction of the secondary battery.

Specifically, the connection end 7a is connected with the first conduction piece 12. For example, the connection end 7a is embedded, welded or injected into the first conduction piece 12. The thermo-deformable piece 7 can be S-shaped, Z-shaped, or C-shaped, etc., thereby improving the bonding strength between the thermo-deformable piece 7 and the first conduction piece 12, and increasing fastness.

In an embodiment, both the connection end 7a and the free end 7b are flat plate sections, the thermo-deformable piece 7 further includes an arc section 7c, and the connection end 7a is connected with the free end 7b via the arc section 7c. The arc section 7c can reduce stress concentration during deformation of the free end 7b.

At normal temperature, the overcharge of the secondary battery causes the electrolyte solution to generate gas, which in turn increases the internal pressure of the secondary battery. When the internal pressure exceeds the reference pressure, the contact piece 6 deforms under the internal pressure to be electrically connected with the free end 7b of the thermo-deformable piece 7, and at this time the first electrode terminal 11 is electrically connected with the second electrode terminal 13, the short circuit state of the secondary battery is maintained, and the overcharge state is stopped, thereby improving the safety performance of the secondary battery.

In addition, when the secondary battery is in the hot-box test or at a relatively high environment temperature (e.g., 80° C.-150° C.) which causes the deformation of the thermo-deformable piece 7, the free end 7b deforms along a direction away from the contact piece 6, and the thermo-deformable piece 7 is kept insulated from the contact piece 6.

It should be noted that, when the environment temperature of the secondary battery is relatively high, the electrolyte solution in the secondary battery may also generate gas and cause increase of the internal pressure of the secondary battery.

In an embodiment, when the internal pressure of the secondary battery increases but does not exceed a preset reference pressure under which the contact piece 6 begins to deform, i.e., the contact piece 6 will not deform under such internal pressure, the thermo-deformable piece 7 can be reliably kept insulated from the contact piece 6.

In another embodiment, the internal pressure of the secondary battery exceeds the preset reference pressure, and the contact piece 6 deforms under the internal pressure, while a sufficient space (i.e., clearance) can still be maintained between the contact piece 6 and the thermo-deformable piece 7 to ensure the insulation state of the two, by matching the deformation amount of the contact piece 6 with the deformation amount of the thermo-deformable piece 7.

Thus, at a high temperature, the thermo-deformable piece 7 can be always kept insulated from the contact piece 6 by setting that the thermo-deformable piece 7 deforms along a direction away from the contact piece 6. As such, the electric connection path between the first electrode terminal 11 and the second electrode terminal 13 is cut off, which avoids the large amount of heat generated by the short circuit current, reduces the occurrence probability of dangerous accidents of the electrode assembly 2, such as fire, explosion, etc., thereby improving safety of the secondary battery.

As shown in FIGS. 2-3, a hole 141 is defined in the top cover plate 14, a through hole 421 is defined in a portion of the second portion 42 directly facing the contact piece 6. When the internal pressure of the secondary battery exceeds the reference pressure, the contact piece 6 deforms under the internal pressure, and the deformed contact piece 6 can contact the thermo-deformable piece 7 through the hole 141 and the through hole 421.

As shown in FIG. 4, the contact piece 6 includes an edge portion 61, a deformable portion 62, and a central portion 63. The deformable portion 62 connects the edge portion 61 with the central portion 63, the edge portion 61 is attached to the top cover plate 14, the central portion 63 of the deformed contact piece 6 contacts the thermo-deformable piece 7, and the deformable portion 62 is bent to protrude away from the electrode assembly 2.

The contact piece 6 can be a member including portions of different thicknesses, and the portion with a different thickness can be a protrusion contacting the thermo-deformable piece 7; or a thickness of the contact piece 6 gradually changes from the periphery to the center of the contact piece 6, and the contact piece 6 is thickest at the center, so that the contact piece 6 contacts the thermo-deformable piece 7 when deforming.

The thermo-deformable piece 7 is generally made of a variety of metal materials of different types with different thermal expansion coefficients, in order to control the deformation direction of the thermo-deformable piece 7. In an embodiment, the thermo-deformable piece 7 includes a first deformable plate 71 and a second deformable plate 72 stacked up, and the first deformable plate 71 can be bonded to the second deformable plate 72 by embedding, welding or riveting.

The thermal expansion coefficient of the first deformable plate 71 is greater than the thermal expansion coefficient of the second deformable plate 72. In order to realize the deformation direction of the thermo-deformable piece 7, it is set that the first deformable plate 71 is placed at a side of the second deformable plate 72 close to the contact piece 6.

In the present embodiment, the material of the first deformable plate 71 can manganese-nickel-copper alloy, nickel-chromium-iron alloy, nickel-manganese-iron alloy, or nickel, and the material of the second deformable plate can be nickel-iron alloy.

In another embodiment, it is also set that the thermo-deformable piece 7 includes the first deformable plate 71 and a second deformable plate 72 stacked up, and the first deformable plate 71 is placed at a side of the second deformable plate 72 close to the contact piece 6, while the first deformable plate 71 and the contact piece 6 can be made of the same material, the material of the second deformable plate 72 can be a memory alloy, and the electrical resistivity of the first deformable plate 71 is smaller than the electrical resistivity of the second deformable plate 72. As such, the contact resistance between the first deformable plate 71 and the contact piece 6 of a same material is small, and when the first electrode terminal 11 of the secondary battery is electrically connected with the second electrode terminal 13, the electrical connection path therebetween can generate greater short circuit current to fuse the fuse member connected between the first electrode plate and the first electrode terminal 11, and to prevent the circumstance that the contact piece 6 is fused while the fuse member is not fused at the instant when the contact piece 6 contacts the first deformable plate 71, thereby solving the problem of overcharging of the secondary battery at normal temperature.

For example, both the first deformable plate 71 and the contact piece 6 can be metal member of aluminum or aluminum alloy, the material of the second deformable plate can be gold-cadmium alloy, silver-cadmium alloy, copper-zinc alloy, copper-zinc-aluminum alloy, copper-zinc-tin alloy, copper-zinc-silicon alloy, copper-tin alloy, copper-zinc-gallium alloy, indium-titanium alloy, gold-copper-zinc alloy, nickel-aluminum alloy, iron-platinum alloy, titanium-nickel alloy, titanium-nickel-palladium alloy, titanium-niobium alloy, uranium-niobium alloy, or iron-manganese-silicon alloy.

In the above two embodiments, the thermo-deformable piece 7 is composed of two metal layers with different thermal expansion coefficients. However, the thermo-deformable piece 7 is not limited to a structure of two layers, and in some other embodiments, the thermo-deformable piece 7 may be composed of three or more deformable metal sheets with different thermal expansion coefficients.

Besides, it can be set that the contact piece 6 is matched with the thermo-deformable piece 7. In one embodiment, it is set that there is an interference amount of about 0.5 mm between the contact piece 6 and the thermo-deformable piece 7. For example, when the contact piece 6 deforms and contacts the thermo-deformable piece 7 at a temperature of 80° C. or less, the deformation of the thermo-deformable piece 7 can be controlled to be no greater than 0.3 mm. At this time, there is still an interference of about 0.2 mm between the contact piece 6 and the thermo-deformable piece 7, which guarantees good contact and reliable current transportation between the contact piece 6 and the thermo-deformable piece 7.

The thickness of the thermo-deformable piece 7 can be in a range of 1 mm-1.5 mm. On one hand, the secondary battery can have sufficient strength for contacting with the contact piece 6 when overcharged, on the other hand, when the thickness of the thermo-deformable piece 7 is 1.5 mm or less, a deformation amount of 1 mm-5 mm can be formed at 40° C.-150 C.

Further, an angular displacement of the free end 72 along the direction away from the contact piece 6 is set within a range of 0°-5°, so that there is good contact between the contact piece 6 and the thermo-deformable piece 7 at a normal temperature, while the contact piece 6 is reliably insulated from the thermo-deformable piece 7 at a high temperature.

The present application further provides a secondary battery, including a top cover assembly 1 for a secondary battery as described in any embodiment above, an electrode assembly 2, and a housing 3. The top cover assembly 1 for a secondary battery is connected to the opening of the housing 3 to form a packaging space, and the electrode assembly 2 is packaged in the packaging space.

The electrode assembly 2 includes a first electrode plate, a second electrode plate, and a separator disposed between the first electrode plate and the second electrode plate. The flange portion 11a of the first electrode terminal 11 is electrically connected with the first electrode plate, and the flange portion 11a of the second electrode terminal 13 is electrically connected with the second electrode plate.

The electrode assembly 2 is formed by helically winding the first electrode plate, the second electrode plate whose polarity is opposite to that of the first electrode plate, and the separator. The separator is an insulator sandwiched between the first electrode plate and the second electrode plate. Alternatively, the electrode assembly 2 can be formed by stacking a plurality of first electrode plates, a plurality of separators, and a plurality of second electrode plates, and these plates and separator are all shaped like plates and sheets.

The first electrode plate may be a negative electrode, and correspondingly, the second electrode plate may be a positive electrode; or, the first electrode plate is a positive electrode, and correspondingly, the second electrode plate is a negative electrode.

The first electrode plate and the second electrode plate each have a thin plate used as current collector. The thin plate of the first electrode plate includes a first coated portion coated with active material and an electrode tab without active material coated. The thin plate of the second electrode plate includes a second coated portion coated with active material and a second electrode tab without active material coated.

The housing 3 is substantially shaped like a cube, forming a chamber for accommodating the electrode assembly 2 therein, and an opening is defined at a side of the housing 3.

Besides, a first insulation piece 104 and a second insulation piece 105 are disposed between the top cover plate 14 and the electrode assembly 2. The first insulation piece 104 is used for insulating the top cover plate 14 from the first electrode tab, and the second insulation piece 105 is used for insulating the top cover plate 14 from the second electrode tab.

An air vent 104a is defined in first insulation piece 104. Gas decomposed from the electrode assembly 2 applies a force to the contact piece 6 through the air vent 104a to deform the contact piece 6.

The secondary battery may further include an explosion-proof valve 106, a protective patch 107 for the explosion-proof valve, an injection hole 108, and a sealing member for the injection hole, etc. The explosion-proof valve 106 is turned on when the internal pressure of the secondary battery reaches a preset pressure. Such preset pressure may be higher than the threshold pressure under which the contact piece 6 begins to deform.

The above are merely preferred embodiments of the present application, which are used to limit the present application. For those skilled in the art, the present application can have various changes and modifications. All the modifications, equivalent substitutions and improvements within the principles of the present application shall fall into the protection scope of the present application.

What is claimed is:

1. A top cover assembly for a secondary battery, comprising:
    a first electrode terminal;
    a second electrode terminal;
    a top cover plate insulated from the first electrode terminal and electrically connected with the second electrode terminal;
    a contact piece attached to and being in direct physical contact with the top cover plate; and
    a thermo-deformable piece placed opposite to the contact piece, one end of the thermo-deformable piece being electrically connected with the first electrode terminal, the other end of the thermo-deformable piece being a free end; wherein
    when a temperature at which the thermo-deformable piece deforms is not reached and an internal pressure of the secondary battery exceeds a reference pressure, the contact piece deforms under the internal pressure to be electrically connected with the thermo-deformable piece so that the first electrode terminal is electrically connected with the second electrode terminal, and
    when the temperature at which the thermo-deformable piece deforms is reached, the internal pressure of the secondary battery increases, and, when the internal pressure of the secondary battery exceeds the reference pressure, the free end deforms along a direction away from the contact piece, and the contact piece deforms under the internal pressure so that a space is kept between the deformed free end and the contact piece to insulate the thermo-deformable piece from the contact piece.

2. The top cover assembly according to claim 1, wherein the thermo-deformable piece comprises a first deformable plate and a second deformable plate stacked up,
    the first deformable plate is placed at a side of the second deformable plate close to the contact piece, and a thermal expansion coefficient of the first deformable plate is greater than a thermal expansion coefficient of the second deformable plate.

3. The top cover assembly according to claim 2, wherein the first deformable plate is made of manganese-nickel-copper alloy, nickel-chromium-iron alloy, nickel-manganese-iron alloy, or nickel, and the second deformable plate is made of nickel-iron alloy.

4. The top cover assembly according to claim 1, wherein the thermo-deformable piece comprises a first deformable plate and the second deformable plate stacked up,
    the first deformable plate is placed at a side of the second deformable plate close to the contact piece, the first deformable plate and the contact piece are made of a same material, the second deformable plate is made of a memory alloy, and an electrical resistivity of the first deformable plate is smaller than an electrical resistivity of the second deformable plate.

5. The top cover assembly according to claim 4, wherein the first deformable plate and the contact piece are made of aluminum or aluminum alloy, the second deformable plate is made of gold-cadmium alloy, silver-cadmium alloy, copper-zinc alloy, copper-zinc-aluminum alloy, copper-zinc-tin alloy, copper-zinc-silicon alloy, copper-tin alloy, copper-zinc-gallium alloy, indium-titanium alloy, gold-copper-zinc alloy, nickel-aluminum alloy, iron-platinum alloy, titanium-nickel alloy, titanium-nickel-palladium alloy, titanium-niobium alloy, uranium-niobium alloy, or iron-manganese-silicon alloy.

6. The top cover assembly according to claim 1, wherein an angular displacement of the free end along the direction away from the contact piece is in a range of 0°-5°.

7. The top cover assembly according to claim 1, further comprising a first conduction piece connected to the first electrode terminal, wherein the one end of the thermo-deformable piece is connected with the first conduction piece and the thermo-deformable piece is electrically connected with the first electrode terminal via the first conduction piece, the one end of the thermo-deformable piece is named as a connection end, and the connection end is connected with and placed in the first conduction piece.

8. The top cover assembly according to claim 7, wherein the thermo-deformable piece comprises an arc section, and the connection end is connected with the free end via the arc section.

9. A secondary battery, comprising:
a housing;
the top cover assembly according to claim 1, wherein the top cover assembly for a secondary battery is connected to an opening of the housing to form a packaging space; and
an electrode assembly packaged in the packaging space, wherein the electrode assembly comprises a first electrode plate, a second electrode plate, and a separator placed between the first electrode plate and the second electrode plate; wherein the first electrode terminal is electrically connected to the first electrode plate, and the second electrode terminal is electrically connected to the second electrode plate.

10. The secondary battery according to claim 9, wherein the thermo-deformable piece comprises a first deformable plate and a second deformable plate stacked up,
the first deformable plate is placed at a side of the second deformable plate close to the contact piece, and a thermal expansion coefficient of the first deformable plate is greater than a thermal expansion coefficient of the second deformable plate.

11. The secondary battery according to claim 10, wherein the first deformable plate is made of manganese-nickel-copper alloy, nickel-chromium-iron alloy, nickel-manganese-iron alloy, or nickel, and the second deformable plate is made of nickel-iron alloy.

12. The secondary battery according to claim 9, wherein the thermo-deformable piece comprises a first deformable plate and the second deformable plate stacked up,
the first deformable plate is placed at a side of the second deformable plate close to the contact piece, the first deformable plate and the contact piece are made of a same material, the second deformable plate is made of a memory alloy, and an electrical resistivity of the first deformable plate is smaller than an electrical resistivity of the second deformable plate.

13. The secondary battery according to claim 12, wherein the first deformable plate and the contact piece are made of aluminum or aluminum alloy, the second deformable plate is made of gold-cadmium alloy, silver-cadmium alloy, copper-zinc alloy, copper-zinc-aluminum alloy, copper-zinc-tin alloy, copper-zinc-silicon alloy, copper-tin alloy, copper-zinc-gallium alloy, indium-titanium alloy, gold-copper-zinc alloy, nickel-aluminum alloy, iron-platinum alloy, titanium-nickel alloy, titanium-nickel-palladium alloy, titanium-niobium alloy, uranium-niobium alloy, or iron-manganese-silicon alloy.

14. The secondary battery according to claim 9, wherein an angular displacement of the free end along the direction away from the contact piece is in a range of 0°-5°.

15. The secondary battery according to claim 9, wherein the top cover assembly further comprises a first conduction piece connected to the first electrode terminal, wherein the one end of the thermo-deformable piece is connected with the first conduction piece and the thermo-deformable piece is electrically connected with the first electrode terminal via the first conduction piece, the one end of the thermo-deformable piece is named as a connection end, and the connection end is connected with and placed in the first conduction piece.

16. The secondary battery according to claim 15, wherein the thermo-deformable piece comprises an arc section, and the connection end is connected with the free end via the arc section.

* * * * *